US006692074B1

United States Patent
Kopetzky et al.

(10) Patent No.: US 6,692,074 B1
(45) Date of Patent: Feb. 17, 2004

(54) APPARATUS AND METHOD FOR BI-DIRECTIONAL CABLE ADJUSTMENT OF AN ERGONOMIC SUPPORT

(75) Inventors: Robert Kopetzky, Lauf (DE); Joseph Benson, South Lyon, MI (US); Horia Blendea, Windsor (CA)

(73) Assignee: L & P Property Management Company, Carthage, MI (US)

( * ) Notice: Subject to any disclaimer, the term of this patent is extended or adjusted under 35 U.S.C. 154(b) by 0 days.

(21) Appl. No.: 10/307,665

(22) Filed: Dec. 2, 2002

(51) Int. Cl.$^7$ .............................................. A47C 3/025
(52) U.S. Cl. ................................ 297/284.8; 297/284.4
(58) Field of Search ........................ 297/284.1, 284.4, 297/284.7, 284.8

(56) References Cited

U.S. PATENT DOCUMENTS

| | | | |
|---|---|---|---|
| 4,316,631 A | 2/1982 | Lenz et al. | 297/284 |
| 4,909,568 A | 3/1990 | Dal Monte | 297/284 |
| 5,026,116 A | 6/1991 | Dal Monte | 297/284 |
| 5,050,930 A | 9/1991 | Schuster et al. | 257/284 |
| 5,174,526 A | 12/1992 | Kanigowski | 244/122 R |
| 5,197,780 A | 3/1993 | Coughlin | 297/284.4 |
| 5,217,278 A | 6/1993 | Harrison et al. | 297/284.7 |
| 5,397,164 A | 3/1995 | Schuster et al. | 297/284.1 |
| 5,449,219 A | 9/1995 | Hay et al. | 297/284.4 |
| 5,474,358 A | 12/1995 | Maeyaert | 297/284.7 |
| 5,518,294 A | 5/1996 | Ligon, Sr. et al. | 297/284.4 |
| 5,609,394 A | 3/1997 | Ligon, Sr. et al. | 297/284.4 |
| 5,638,722 A | 6/1997 | Klingler | 75/502.4 |
| 5,651,583 A | 7/1997 | Klingler et al. | 297/284.4 |
| 5,651,584 A | 7/1997 | Chenot et al. | 297/284.4 |
| 5,704,687 A | 1/1998 | Klingler | 297/284.4 |
| 5,762,397 A | 6/1998 | Venuto et al. | 297/284.4 |
| 5,791,733 A | 8/1998 | Van Hekken et al. | 297/284.4 |
| 5,823,620 A | 10/1998 | Le Caz | 297/284.4 |
| 5,857,743 A | 1/1999 | Ligon, Sr. et al. | 297/284.9 |
| 5,911,477 A | 6/1999 | Mundell et al. | 297/284.4 |
| 5,913,569 A | 6/1999 | Klingler | 297/284.4 |
| 5,984,407 A | 11/1999 | Ligon, Sr. et al. | 297/284.4 |
| 5,988,745 A | 11/1999 | Deceuninck | 297/284.4 |
| 6,007,151 A | 12/1999 | Benson | 297/284.4 |
| 6,036,265 A | 3/2000 | Cosentino | 297/284.4 |
| 6,045,185 A | 4/2000 | Ligon, Sr. et al. | 297/284.4 |
| 6,050,641 A | 4/2000 | Benson | 297/284.4 |
| 6,079,783 A | 6/2000 | Schuster, Sr. et al. | 297/284.4 |
| 6,152,531 A | 11/2000 | Deceuninck | 297/284.4 |
| 6,158,300 A | 12/2000 | Klingler | 74/526 |
| 6,227,618 B1 | 5/2001 | Ligon, Sr. et al. | 297/284.4 |
| 6,254,186 B1 | 7/2001 | Falzon | 297/284 |
| 6,270,158 B1 | 8/2001 | Hong | 297/284.4 |
| 6,296,308 B1 | 10/2001 | Cosentino et al. | 297/284.4 |
| 6,334,651 B1 | 1/2002 | Duan et al. | 297/284.4 |

FOREIGN PATENT DOCUMENTS

| | | | | |
|---|---|---|---|---|
| EP | 0563709 | * | 10/1993 | |
| EP | 0 485 483 B1 | | 1/1994 | A47C/7/46 |
| EP | 0 540 481 B1 | | 12/1995 | A47C/7/46 |
| EP | 0 702 522 B1 | | 3/1997 | A47C/7/46 |
| GB | 2 013 487 A | | 8/1979 | A47C/7/46 |
| WO | WO 00/00064 | | 1/2000 | A47C/3/025 |

* cited by examiner

Primary Examiner—Laurie K. Cranmer
(74) Attorney, Agent, or Firm—Grant D. Kang, Esq.; Robert C. Haldiman, Esq.; Husch & Eppenberger, LLC

(57) ABSTRACT

A variable lumbar support has a support assembly mountable on a seat frame, a pressure element engaged with the support assembly to move in relation to it in a first direction and a second direction. The directions are substantially parallel and opposite and usually vertical. A first traction element engaged with the support assembly and the pressure element moves the pressure element in the first direction and a second traction element engaged with the support assembly and with the pressure element moves the pressure element in the second direction. At least one actuator engaged with the traction elements causes the movement.

23 Claims, 4 Drawing Sheets

APPARATUS AND METHOD FOR BI-DIRECTIONAL CABLE ADJUSTMENT OF AN ERGONOMIC SUPPORT

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention is in the field of adjustable ergonomic supports for seats, especially automobile seats.

2. Related Art

A variety of adjustable ergonomic supports for seating are known. These systems involve movement of an ergonomic support towards and away from the seat occupant in order to support various portions of the seat occupant's body. Many such ergonomic support devices, especially lumbar supports, also move vertically, so that apex of a lumbar supporting arch may be adjusted up and down so that the supports may be custom adjusted to particular individuals spine.

Such lumbar supports may be roughly divided into four classes. There is an arching basket type, see, e.g., U.S. Pat. No. 5,498,063; a push paddle type see, e.g., U.S. patent application Ser. No. 09/798,657; a tensioning strap type, see, e.g., U.S. Pat. No. 5,769,490; and pneumatic systems, see, e.g., U.S. Pat. No. 5,637,076, all incorporated by reference herein. All of these various types may be mounted on vertical slides so that they can be adjusted vertically. It is common for arching pressure surface type lumbar supports to be mounted on vertical guide rods. A pressure surface may be flexed or bowed outwards to provide a lumbar support, generally through the application of traction via a cable. The release of cable traction allows the natural bias of the pressure surface, usually stamped metal or molded plastic, to flatten it into a rest position, which action is augmented by the weight of the seat occupant.

There is not any natural bias or external force that helps the arching pressure surface type lumbar support to move in either vertical direction however. Prior art lumbar supports have achieved vertical movement of the arching pressure surface by biasing it towards a rest position, usually a bottom position, with springs. Vertical movement into a higher position has been achieved by attaching a single traction cable to the arching pressure surface. This mechanism requires a traction cable and an actuator for applying traction to the cable that are of a heavy enough gauge and great enough power can overcome the opposing tensioning force of the spring.

In the lumbar support field, as in auto parts in general, there is a continuing need for reducing costs, complexity and expense and also a continuing need for increasing durability, simplicity, compactness and ease of assembly. There is a need in the lumbar support arts for achieving vertical movement for a lumbar support in a manner that avoids the expense, complexity and weight of prior art single cable and spring apparatuses.

SUMMARY OF THE INVENTION

The present invention is a two cable system for vertical movement of a lumbar support.

In an arching pressure surface lumbar support with vertical adjustment capability, an arching pressure surface is mounted on vertical guide rails so that the entire pressure surface may slide vertically on the rails, either when the pressure surface is flat or bowed outwards to provide lumbar support. At one end of the pressure surface a traction cable is disposed to pull the pressure surface upwards. Another end of a traction cable is disposed to pull the pressure surface downwards.

In alternative embodiments, two separate traction cables may be used, or a single traction cable disposed in a loop fashion may be used.

Traction cables, such as the commonly used Bowden cable, are coaxial mechanical devices having a conduit or sleeve inside of which a wire is disposed to slide axially. In all embodiments, an end of a Bowden cable sleeve (or wire) is mounted to a fixed, non-moving support bracket and an end of the Bowden cable wire (or sleeve) is fixed to the arching pressure surface. An actuator at the other end of the Bowden cable applies traction, drawing the wire into the cable. At the first end of the Bowden cable the wire, now under traction, draws the pressure surface to which it is attached towards the fixed mounting of the Bowden cable sleeve end. The pressure surface slides vertically along the guide rails. The second Bowden cable sleeve end is also fixedly mounted to a bracket and a second Bowden cable wire end is also attached to the pressure surface and disposed to pull the pressure surface in the opposite vertical direction when tension is applied to the second Bowden cable wire. The fixed mounting of the Bowden cable sleeves may be on opposite vertical ends of the pressure surface. Alternatively, the fixed mounting of the Bowden cable sleeves may be on the same vertical end of the arching pressure surface, with the direction of one end of one of them redirected 180° by a pulley or other deflection apparatus fixedly mounted on the opposite end of the lumbar support. The two Bowden cable sleeve ends and wire ends may be opposite ends of a single Bowden cable, with an actuator remotely engaged thereto in order to pull it in either direction. Alternatively, two separate Bowden cables may be used. Two separate Bowden cables may be driven by a single actuator capable of bi-directional action, or by two separate actuators.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
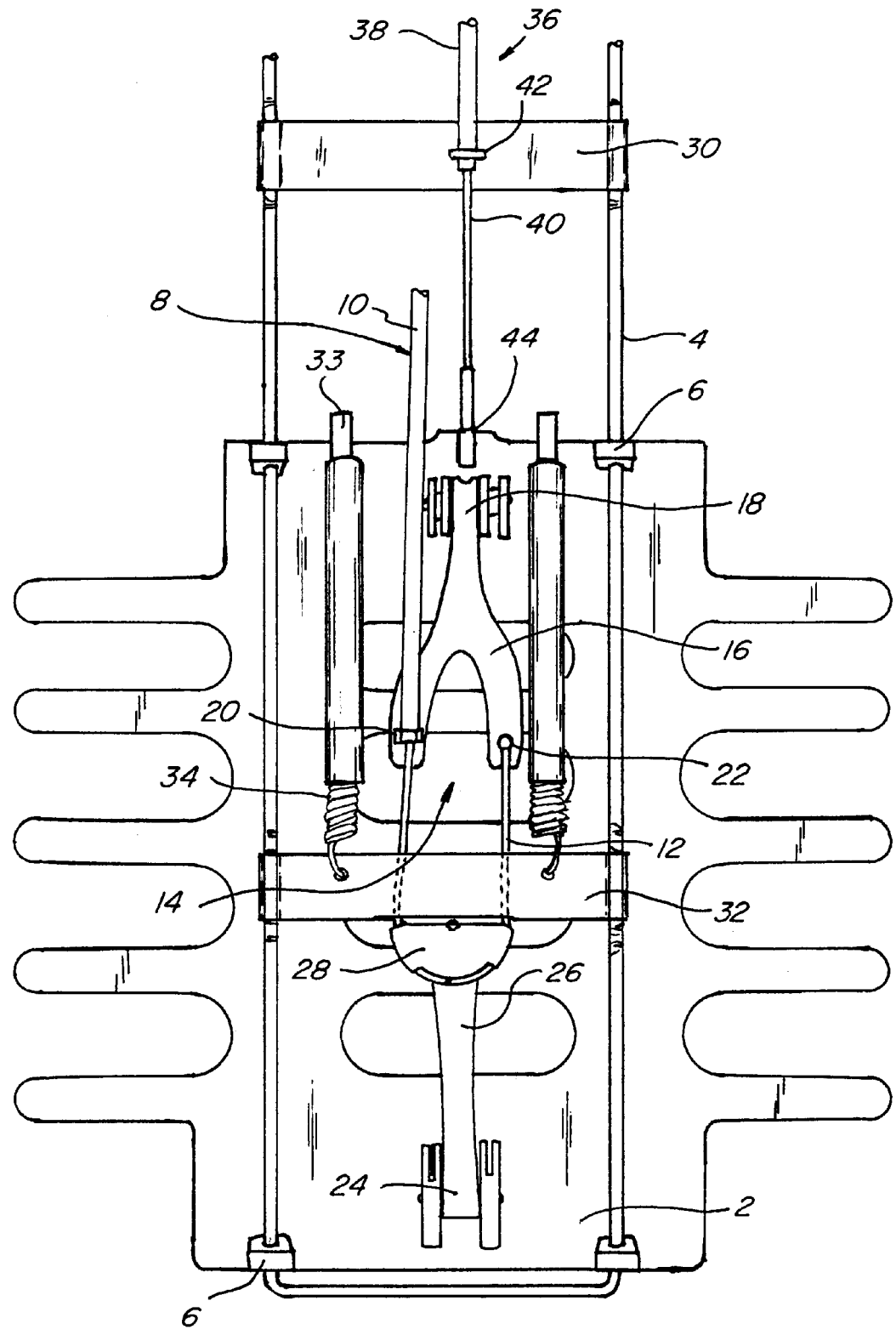
FIG. 1 illustrates a back view of a prior art four way lumbar support.

Referring to the accompanying drawings in which like reference numbers indicate like elements, FIG. 1 depicts a prior art four way lumbar support from a back view. An arching pressure surface 2 is mounted on guide rails 4 at slide mounts 6. The slide mounts 6 allow vertical or "up and down" travel of the entire arching pressure surface 2. Up and down are two of the "four way" directions in which such a lumbar support may move. The other two of the four ways are "in and out." That is, towards a seat occupant and away from the seat occupant. Movement towards the seat occupant is achieved by arching the flexible pressure surface 2. It is achieved by moving the two pairs of slide guide rail mounts 6 towards one another. This movement is achieved by a traction cable drawing an upper portion and a lower portion of the arching pressure surface together. Accordingly, there is a traction cable 8 consisting of traction cable conduit 10 (also called a "sleeve" or "sheath"). A wire 12 is drawn coaxially through the conduit 10, applying traction to the lumbar support. Traction is applied at the other end of the traction cable 8, most commonly a Bowden cable, by an actuator (not shown).

In the depicted embodiment, the arching or "in and out" movement is achieved by traction that is applied to the arching pressure surface 2 by traction assembly 14. There is a great variety of traction application assemblies, of which assembly 14 is only one. The feature common to all of them is that they apply traction to draw the upper portion and lower portion of the arching pressure surface 2 towards one another.

In the depicted embodiment, the mount 16 is hingedly attached to the arching pressure surface 2 at hinge 18. Mount 16 has a Bowden cable conduit mount 20 and a Bowden cable wire mount 22. At the opposite end portion of the arching pressure surface 2, is a hinge 24, and a deflection mount member 26. The deflection mount member 26 has a deflector 28 which redirects the path of the Bowden cable wire 12 from the Bowden cable conduit mount 20 around the deflector 28 and back to the Bowden cable wire mount 22. In operation, when an actuator (is not shown) applies forced to draw the Bowden cable wire 12 into Bowden cable conduit 10, the mount 16 and mount 26 are drawn together, correspondingly drawing the ends of the arching pressure surface together, thereby causing the arch or bow that provides lumbar support.

The two cable system of the present invention is directed not towards the "in and out" movement but the "up and down" movement of the four way lumbar support. Accordingly, those of skill in the art will appreciate that arching traction application assembly 14 may be replaced by any other such assembly known in the art, or to be developed in the future. The two cable vertical motion system described below will work equally well with any such arching traction application assembly.

As with prior art systems, the vertical motion of the arching pressure surface may be effected regardless of the profile to which the arching pressure surface 2 has been bowed.

Guide rails 4 have mounted on them an upper bracket 30 and a lower bracket 32. (Orientation is a design choice. Whether the brackets, mounts, and other elements of the present invention are installed as the "upper" or "lower" end is immaterial to the operation of the present invention.) The depiction of the prior art in FIG. 1 illustrates that springs 34 bias the pressure surface towards what is there shown as its lower position. The springs 34 are mounted at one end on bracket 32 and at their other end to the upper portion of arching pressure surface 2 with mounts 33. In order to move the arching pressure surface from its lower most position, traction must be applied by a traction cable 36 in an upward direction. Accordingly, the vertical motion Bowden cable 36 has a conduit 38 with a wire 40 sliding coaxially through it. The conduit 38 is mounted on bracket 30 at mount 42. Mount 42 allows wire 40 to proceed past or through it to where wire 40 is mounted on arching pressure surface 2 at mount 44. An actuator (not shown) at the other end of cable 36 draws wire 40 into conduit 38. The arching pressure surface 2 is pulled as a whole, upwards towards bracket 30, against the force of springs 34.

It is apparent that traction cable 36 and the actuator that applies traction to it must be of sufficient power and size to overcome the tensioning force of springs 34 in order to move the arching pressure surface 2 vertically and thereafter to maintain it in a selective position.

The two cable vertical motion system of the present invention allows elimination of the prior art springs 34, and allows the use of smaller, lighter and less expensive components corresponding to cable 36 and the actuators for it.

Figure 2:
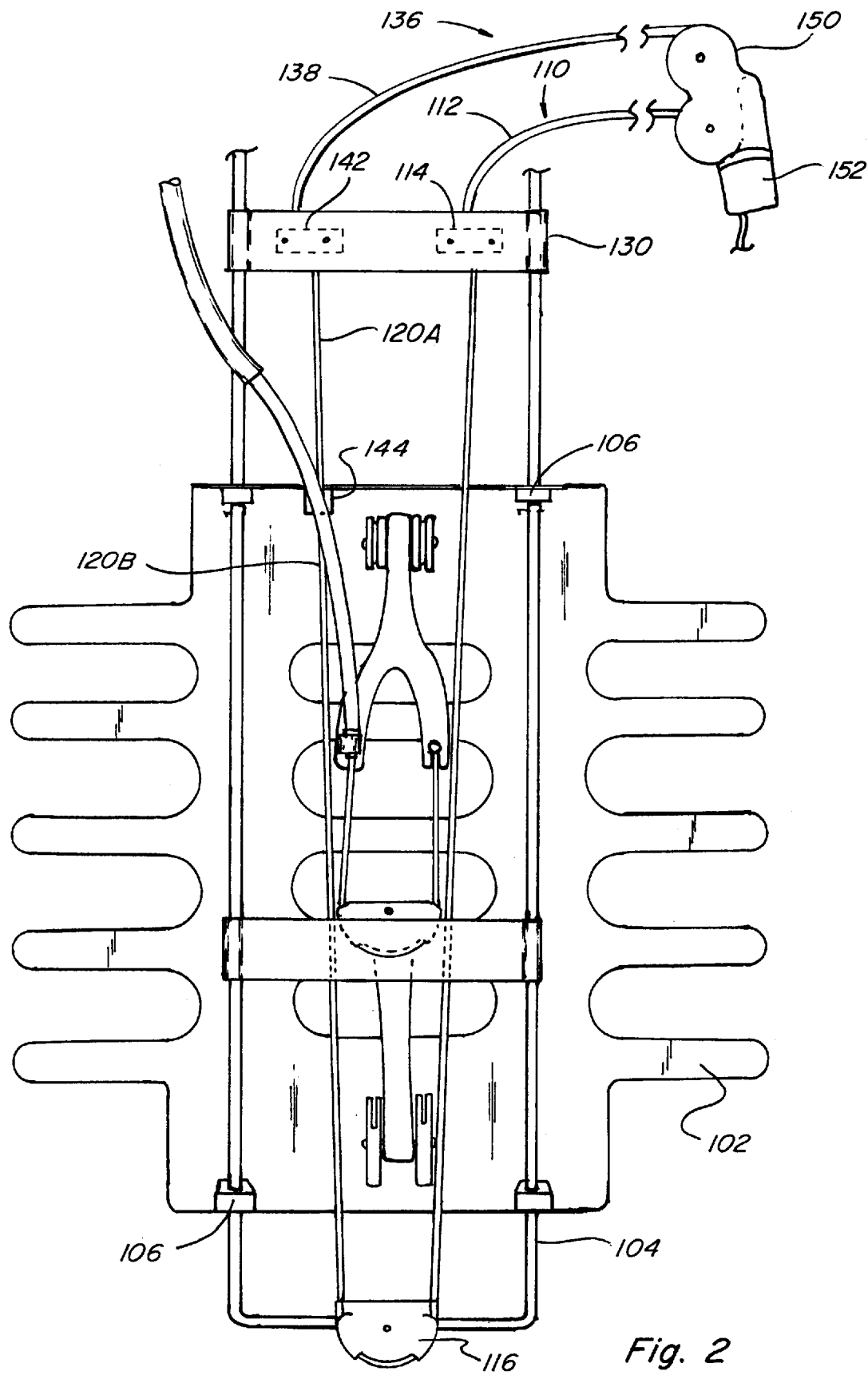
FIG. 2 illustrates a back view of a first embodiment of the two cable four way lumbar support of the present invention.

FIG. 2 depicts a back view of a first embodiment of the two cable vertical motion system of the present invention. As with the prior art, an arching pressure surface 102 slides vertically on guide rails 104 via mounts 106.

The novel two cable vertical motion system of the present invention uses one cable end to pull the arching pressure surface 2 upwards, and another cable end to pull it downwards, eliminating the need for springs. In the embodiment depicted in FIG. 2, bracket 130 has mounts for not one traction cable, 136, but two, including also traction cable 110. Traction cable 136 has a conduit 138 mounted at mount 142 on bracket 130. Second traction cable 110 has a conduit 112 mounted on bracket 130 at mount 114.

Another mount, 144 serves to fix Bowden cable wire ends to the arching pressure surface 102. The present invention may be achieved by using either two Bowden cables with two wires having two ends, or, alternatively, by a single Bowden cable having a single wire arranged in a loop so that the two ends of the single wire may be applied for vertical movement of the arching pressure surface. FIG. 2 depicts an embodiment wherein a single Bowden traction cable wire is arranged in a loop having a first end 120A and the second end 120B, both of which are mounted to arching pressure surface 102 at mount 144. Between its end regions 120A and 120B, the wire proceeds as a loop through the Bowden cable conduit 138 and through actuator 150, powered by electric motor 152. A variety of actuators are known in the art, including those that can apply traction in either direction to a continuous Bowden cable wire loop. After travelling through its engagement with actuator 150, a single Bowden cable wire loop may proceed back through conduit 112, around a deflection point or pulley 116 and back to a single mounting 144 to the arching pressure surface 120. Alternatively, a separate mount may be used.

In operation, actuator 150 can pull the Bowden cable wire 120 A/B in a first direction to apply traction to mount 144 and raise the arching pressure surface 102. The actuator 150 can also apply traction to Bowden cable wire 120 A/B in the opposite direction to apply vertical traction to arching pressure surface 102 at mount 144 to draw it downwards.

Figure 3:
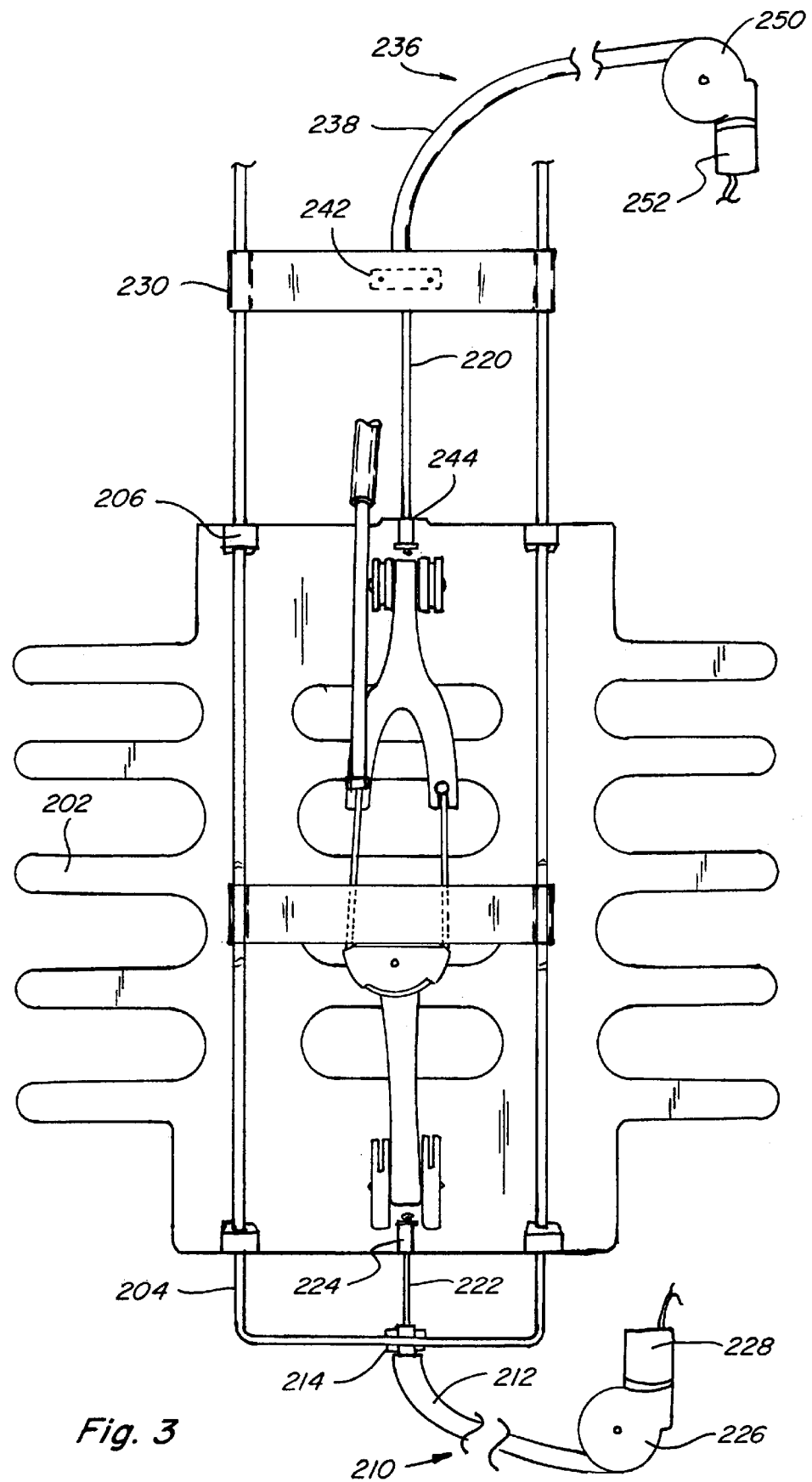
FIG. 3 illustrates a back view of another embodiment of the four way lumbar support of the present invention.

FIG. 3 depicts an alternative embodiment of the two cable vertical motion system of the present invention. Therein, arching pressure surface 202 rides on guide rails 204 at mounts 206. In this embodiment, the upper traction cable 236 has a conduit 238 mounted to upper bracket 230 at mount 242. Wire 220 proceeds from conduit 238 through or past mount 242 to mount 244 fixing wire 220 to arching pressure surface 202 at one end. In the depicted embodiment, actuator 250, powered by motor 252 may draw wire 220 into conduit 238 in order to vertically raise the arching pressure surface 202.

A second traction cable 210 is attached to the opposite end of the arching pressure surface 202. In this depicted embodiment, the second wire 222, which travels axially through conduit 212, is not a continuous loop with the upper wire 220, but rather an entirely separate wire. Out from conduit 212 and through or past mount 214, which may be placed on transverse section of guide rails 204 or, alternatively, placed on a separate bracket (not shown), wire 222 proceeds to mount 224 where wire 222 is fixed to arching pressure surface 202. An actuator 226, powered by electric motor 228, draws wire 222 into conduit 212. This traction draws the arching pressure surface 202 downward. In operation, by coordinating the alternative operation of actuators 250 and 226 by known methods, two separate cables may raise and lower the arching pressure surface 202 without the presence of springs.

Figure 4:
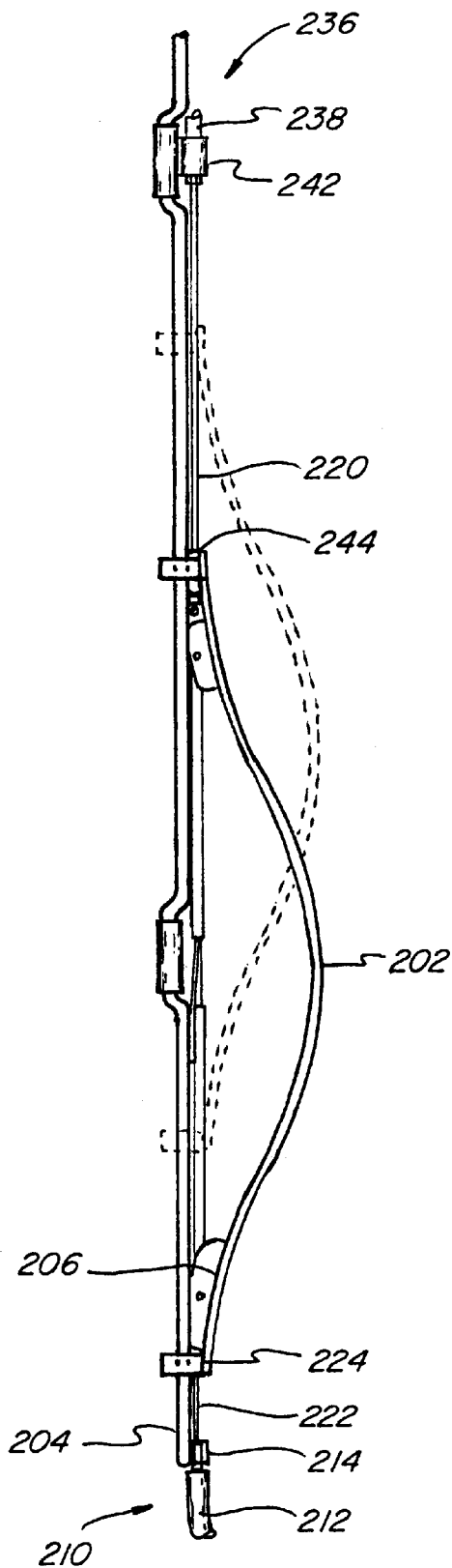
FIG. 4 illustrates a side view of the second embodiment of two cable lumbar support of the present invention.

FIG. 4 is a side view of an arching pressure surface lumbar support incorporating the two cable system of the present invention. FIG. 4 shows the arching pressure surface 202 in a lower vertical position and, in phantom, in a raised position. The arching pressure surface 202 may be raised and lowered whether it is minimally arched or relatively flat, and when it is maximally arched. Actuators, not shown in FIG. 4, may be electrical, or, alternatively, may be manual.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example,. Thus, the breadth and scope of the present invention should not be limited by any of the above-described exemplary embodiments, but should be defined only in accordance with the following claims appended hereto and their equivalents.

What is claimed is:

1. A variable ergonomic support comprising:
   a support assembly mountable on a seat frame:
   a pressure element engaged with said support assembly to move in relation to said support assembly in a first direction and in a second direction, said directions being substantially parallel and opposite;
   a first traction element engaged with said support assembly and said pressure element such that a first tractive force exerted by a first actuator on said first traction element moves said pressure element in said first direction; and
   a second traction element engaged with said support assembly and with said pressure element such that a second tractive force exerted by a second actuator on said second traction element moves said pressure element in said second direction.

2. The variable ergonomic support of claim 1 wherein said first traction element is a first Bowden cable end and said second traction element is a second Bowden cable end.

3. The variable ergonomic support of claim 2 wherein said first Bowden cable end and said second Bowden cable end are ends of separate Bowden cables.

4. A variable ergonomic support according to claim 1 wherein said first and second actuate and selected from the group consisting of: manual and electric.

5. A variable ergonomic support according to claim 1 wherein said first direction and said second direction are substantially vertical.

6. The variable ergonomic support of claim 1 wherein said pressure element is flexible.

7. The variable ergonomic support of claim 1 wherein a third traction cable is engaged with said flexible pressure element such that traction on said third traction cable flexes said flexible pressure element.

8. The variable ergonomic support of claim 1 wherein said pressure element is a lumbar support.

9. The variable ergonomic support of claim 1 wherein one of said first traction element and/or said second traction element operatively communicates with said pressure element via a pulley said pulley is mounted on said support assembly.

10. A variable ergonomic support comprising:
    a support assembly mountable on a seat frame;
    a flexible pressure element engaged with said support assembly to move in relation to said support assembly in a first direction and in a second direction, said directions being substantially parallel and opposite,
    a first traction element engaged with said support assembly and said pressure element such that a first tractive force exerted by said first traction element moves said pressure element in said first direction;
    a second traction element engaged with said support assembly and with said pressure element such that a second tractive force exerted by said second traction element moves said pressure element in said second direction; and
    a third traction element is engaged with said flexible pressure element such that traction on said third traction element flexes said flexible pressure element.

11. The variable ergonomic support of claim 10 wherein said first traction element is a first Bowden cable end and said second traction element is a second Bowden cable end.

12. The variable ergonomic support of claim 11 wherein said first and second Bowden cable ends are ends of the same Bowden cable.

13. The variable ergonomic support of claim 11 wherein said first Bowden cable end and said second Bowden cable end are ends of separate Bowden cables.

14. A variable ergonomic support according to claim 10 wherein said first traction element and said second traction element are each engaged with separate actuators.

15. A variable ergonomic support according to claim 14 wherein said actuators are selected from the group consisting of: manual and electric.

16. A variable ergonomic support according to claim 10 wherein said first direction and said second direction are substantially vertical.

17. The variable ergonomic support of claim 10 wherein said pressure element is a lumbar support.

18. The variable ergonomic support of claim 10 wherein one of said first traction element and/or said second traction element operatively communicates with said pressure element via a pulley; said pulley is mounted on said support assembly.

19. A method of assembling an adjustable lumbar support, comprising the steps of:

engaging a first traction cable to said adjustable lumbar support by attaching a first traction cable sleeve end to a fixed mount and attaching a first traction cable wire end to said adjustable lumbar support such that a first tractive force on said first traction cable moves said adjustable lumbar support in a first direction;

engaging a second traction cable to said adjustable lumbar support by attaching a second traction cable sleeve end to a fixed mount and attaching a second traction cable wire end to said adjustable lumbar support such that a second tractive force on said second traction cable moves said adjustable lumbar support in a second direction substantially parallel and opposite to said first direction; and attaching a third traction cable to said adjustable lumbar support by attaching a third traction cable sleeve end and attaching a third traction cable wire end to said adjustable lumbar support, said adjustable lumbar support being flexible, such that traction on said third traction cable flexes said adjustable lumbar support into a selectable lumbar supporting arch, said arch being maintained upon movement of said adjustable lumbar support caused by traction on either said first traction cable or said second traction cable.

20. The method of claim 19 wherein said first traction cable wire end is attached to said fixed mount and said first traction cable sleeve end is attached to said adjustable lumbar support.

21. The method of claim 19 wherein said second traction cable wire end is attached to said fixed mount and said second traction cable sleeve end is attached to said adjustable lumbar support.

22. A variable ergonomic support device comprising:

a support assembly mountable on a seat frame;

means for slidably mounting a pressure element on said support assembly;

means for engaging a first traction cable with said support assembly and said pressure element such that a first tractive force on said first traction cable moves said pressure element in a first direction;

means for engaging a second traction cable with said support assembly and said pressure element such that a second tractive force on said second traction cable moves said pressure element in a second direction substantially parallel and opposite said first direction;

means for engaging a third traction cable with said support assembly and said pressure element such that a third tractive force on said third traction cable bows said pressure element towards a seat occupant.

23. A variable ergonomic support device comprising:

a guide rod adaptable to mount on a seat frame;

a flexible support element mounted to slide on said guide rod, said flexible support element having at least one traction application point;

at least one fixed mounting bracket mounted on said guide rod, said fixed mounting bracket having at least one traction anchor;

a first traction cable and a second traction cable, each being engaged with an actuator and each having a wire disposed to slide axially through a sleeve, said first traction cable having a first wire end and said first traction cable having a first sleeve end and said second traction cable having a second wire end, and said second traction cable having a second sleeve end;

one of said first wire end or said first sleeve end of said first traction cable being attached to one of said traction anchor or said traction application point, and the other of said first wire end or said first sleeve end being attached to the other of said traction anchor or said traction application point;

one of said second wire end or said second sleeve end of said second traction cable being attached to one of a second traction anchor or a second traction application point, and the other of said second wire end or said second sleeve end being attached to the other of said second traction anchor or said second traction application point;

whereby a first tractive force on said first traction cable draws said flexible support element in a first direction and a second tractive force on said second traction cable draws said flexible support element in a second direction; and a third traction cable engaged with a second actuator and having a third wire end disposed to slide axially from a third sleeve end, said third wire end and said third sleeve end being engaged with said flexible support element;

whereby traction on said third traction cable flexes said flexible support element into a selectable degree of lumbar supporting arch, said selectable degree of lumbar supporting arch being maintained upon movement of said flexible support element in said first direction and in said second direction.

* * * * *

UNITED STATES PATENT AND TRADEMARK OFFICE
CERTIFICATE OF CORRECTION

PATENT NO. : 6,692,074 B1  Page 1 of 1
APPLICATION NO. : 10/307665
DATED : February 17, 2004
INVENTOR(S) : Robert Kopetzky et al.

It is certified that error appears in the above-identified patent and that said Letters Patent is hereby corrected as shown below:

| Column / Line No. | Reads | Should Read |
|---|---|---|
| Col. 6, line 22 | "assembly." | -- apparatus. -- |
| Col. 6, line 65 | "assembly." | -- apparatus. -- |

Signed and Sealed this

Second Day of January, 2007

JON W. DUDAS
*Director of the United States Patent and Trademark Office*